United States Patent [19]

Jensen

[11] Patent Number: 4,699,105

[45] Date of Patent: Oct. 13, 1987

[54] ENGINE IGNITION TIMING BY COMBUSTION PRESSURE HARMONIC PHASE DIFFERENCE

[75] Inventor: Edward J. Jensen, Rochester, Mich.

[73] Assignee: General Motors Corporation, Detroit, Mich.

[21] Appl. No.: 930,934

[22] Filed: Nov. 17, 1986

[51] Int. Cl.[4] .................................... F02P 5/145
[52] U.S. Cl. ................................................ 123/425
[58] Field of Search ............................. 123/425, 435

[56] References Cited

U.S. PATENT DOCUMENTS

| | | | |
|---|---|---|---|
| 4,061,116 | 12/1977 | Saida et al. ......................... | 123/425 |
| 4,466,408 | 8/1984 | Cheklich ............................ | 123/425 |
| 4,481,925 | 11/1984 | Karau et al. ....................... | 123/425 |

Primary Examiner—Andrew M. Dolinar
Attorney, Agent, or Firm—Robert M. Sigler

[57] ABSTRACT

An ignition timing control for an internal combustion engine subjects a combustion pressure signal to multiple switched capacitor bandpass filters with frequencies controlled in phase lock loop from engine speed to generate harmonic wave signals at frequencies which are constant multiples of the varying firing frequency. The phase difference between the peaks of two harmonics such as the second and fourth is used to control ignition timing to a phase difference of zero, in some cases with ignition pulses referenced to the detected peak of the first harmonic (fundamental) rather than a detected crankshaft position. The ratio of peak amplitudes between two harmonics such as the first and fourth is used to control dilution by EGR or variable valve lift to a predetermined ratio. The ratio of the peak amplitude of subharmonics to the fundamental may be used as a roughness or driveability sensor.

4 Claims, 6 Drawing Figures

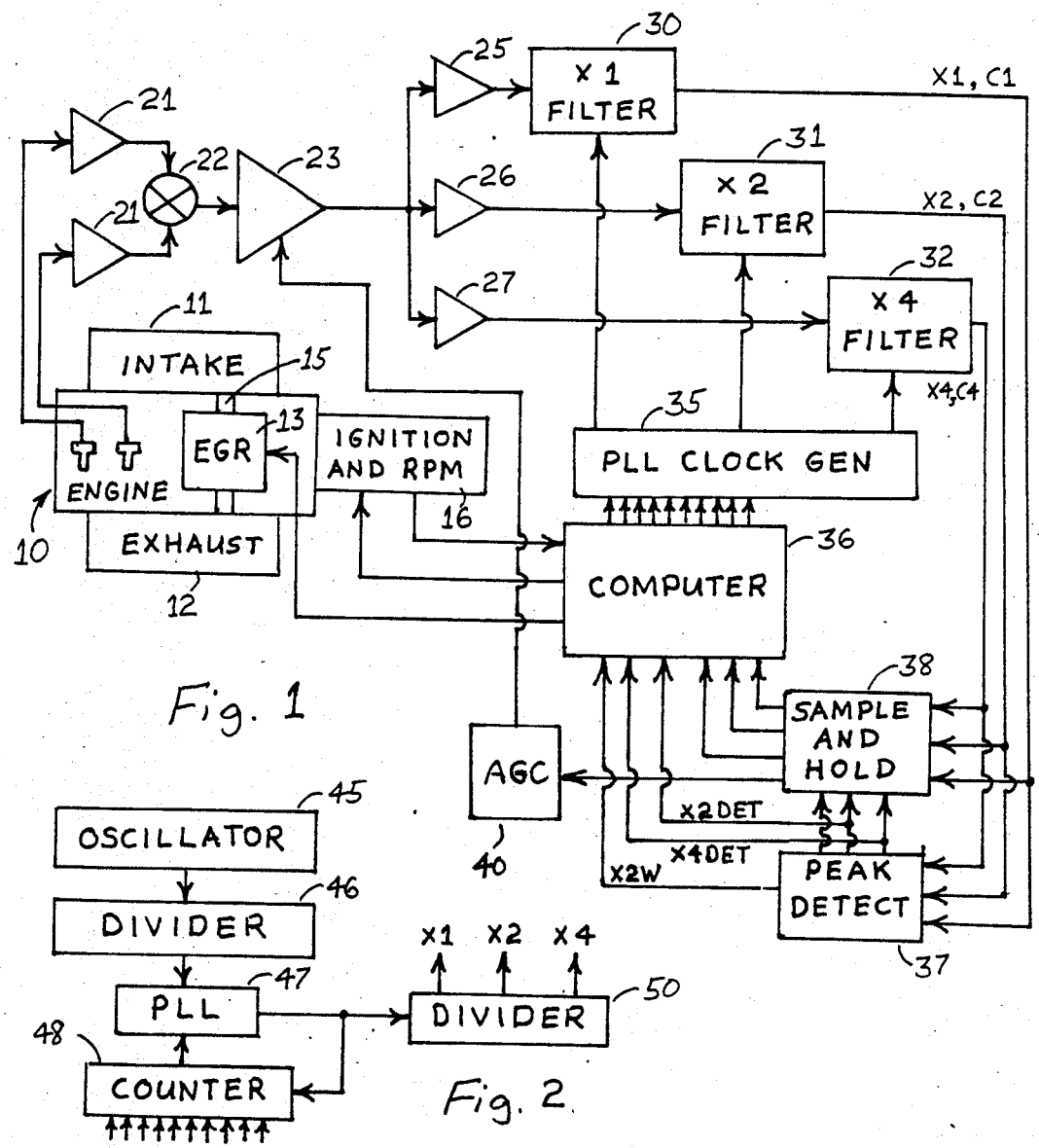
Fig. 1
Fig. 2
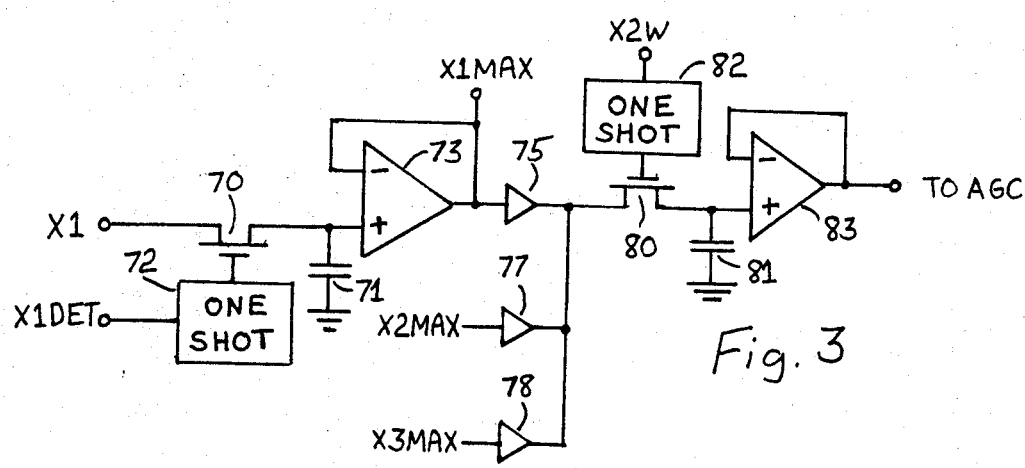
Fig. 3

ENGINE IGNITION TIMING BY COMBUSTION PRESSURE HARMONIC PHASE DIFFERENCE

BACKGROUND OF THE INVENTION

This invention relates to the control of an internal combustion engine in response to combustion pressure and particularly to the control of engine ignition timing. The development of piezoelectric pressure sensors suitable for combustion pressure sensing and microcomputers suitable for internal engine control has created a great deal of interest in engine control in response to combustion pressure, since it is recognized that a great deal of useful information about the combustion process is derivable from the combustion pressure curve.

One approach to the analysis of a combustion pressure curve is the examination of its harmonics. An approximation of a typical combustion pressure waveform and its harmonics at the engine firing frequency, twice this frequency and four times this frequency are shown in FIGS. 5b, 5c, 5d and 5e, respectively. I have discovered certain relationships between these harmonics that show promise in engine control. One such relationship involves the phase difference of corresponding peaks of two different harmonics of the combustion pressure curve. At MBT or optimum ignition timing, these peaks line up in phase. When timing is too retarded or advanced, these peaks shift relatively in phase in a predictable way, as indicated by the vertical broken lines and horizontal arrows, so that a closed loop control of ignition timing is possible by detecting the phase difference in the corresponding peaks of the two harmonics.

SUMMARY OF THE INVENTION

The invention may be summarized as an ignition timing control for an internal combustion engine means for generating a combustion pressure signal, means effective to generate a crankshaft rotational speed signal, frequency selective filter means responsive to the crankshaft rotational speed signal for generating at least two predetermined harmonic signals of the combustion pressure signal at harmonic frequencies which are whole number multiples of the firing frequency of the engine as the rotational speed of the crankshaft changes, means effective to detect the times of corresponding peaks in the two predetermined harmonic signals and determine the difference therebetween and means for varying the ignition timing of the engine to reduce the difference to zero in closed loop operation.

The invention may particularly use switched capacitor filters set up as high Q bandpass filters with a passband and center frequency controlled through phase lock loop techniques to follow crankshaft rotational speed. Two particular harmonics found to be useful for a four cylinder engine are the second and fourth harmonics of the engine firing frequency, with advancement of ignition timing desired if the peak of the fourth harmonic occurs first and vice versa. It is further found that this system, once started, will run without an accurate crankshaft position reference if ignition timing is referenced to the detected peak of the first harmonic or fundamental engine firing frequency.

Further details and advantages will be apparent from the accompanying drawings and following description of a preferred embodiment.

SUMMARY OF THE DRAWINGS

FIG. 1 is a block diagram of an internal combustion engine with a control according to the invention.

FIG. 2 is a block diagram of a PLL clock generator for use in the control of FIG. 1.

FIG. 3 is a diagram of a sample and hold circuit for use in the control of FIG. 1.

DESCRIPTION OF THE PREFERRED EMBODIMENT

Figure 4:
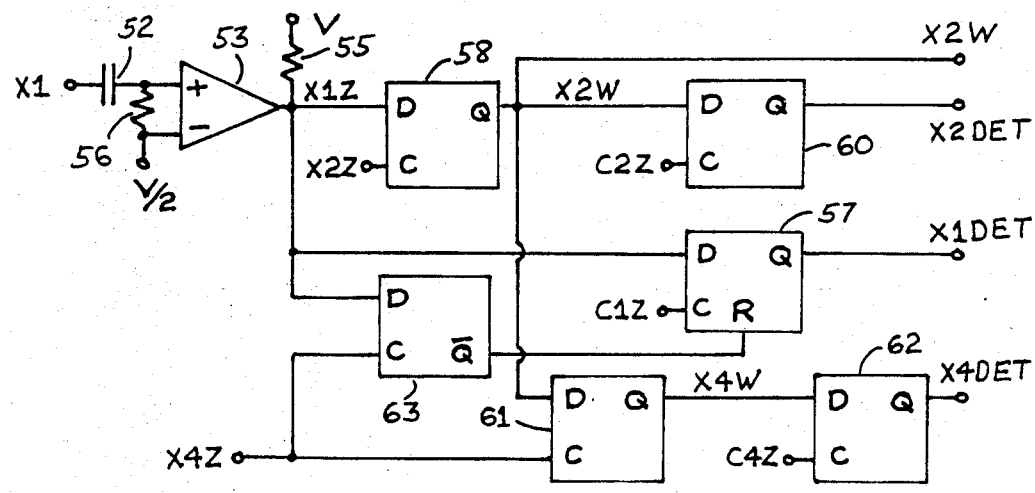
FIG. 4 is a diagram of a peak detect circuit for use in the control of FIG. 1.

Referring to FIG. 1, an internal combustion engine 10, understood to be the driving engine for a motor vehicle, includes intake apparatus 11 and exhaust apparatus 12 of normal construction and operation. Intake apparatus 12 is understood to include a standard air cleaner, fuel/air mixing system such as a carburetor or fuel injection system, an intake manifold and intake valves for the combustion chambers, along with the valve drive train necessary for their proper operation. The fuel/air mixing system may be of the well known closed loop stoichiometric type including an oxygen sensor in the exhaust with a feedback control, the lean burn type in which a lean fuel/air mixture is maintained or any other suitable type. Exhaust apparatus 12 includes the standard exhaust valves and valve train, exhaust pipe and muffler, as well as any necessary exhaust sensor for fuel control.

Engine 10 also includes diluent control, which may be in the form of an electrically controllable EGR valve 13 effective to control the flow of exhaust diluent through a return pipe 15 from exhaust apparatus 12 to intake apparatus 11. EGR valve 13 may be a vacuum operated valve with pulse width modulation electrical control, a stepper motor operated valve or any other known electrically controlled valve. Alternatively, the diluent control may be in the form of an adjustable intake valve mechanism which controls the degree of intake valve lift, whereupon the valve overlap and thus the residual exhaust gas left in the combustion chamber is varied in response to a control signal. Such a mechanism is shown in U.S. patent application Ser. No. 834,791, filed Feb. 28, 1986 by Duane J. Bonvallet and assigned to the assignee of this application.

Engine 10 further includes ignition apparatus 16 of the normal computer controlled spark ignition type, such as that described in U.S. Pat. No. 4,231,091 to Motz, issued Oct. 28, 1980 or its equivalent. The ignition apparatus may include the normal distributor, spark plugs, spark coil and computer apparatus for generating pulses at the appropriate times for firing the spark plugs. In addition, such apparatus includes means for generating reference pulses at predetermined crankshaft angles as the crankshaft rotates in engine operation, such as those shown in FIG. 5a. These pulses are not only useful as reference pulses for ignition timing, but also provide an engine speed signal, since their frequency of occurrence is proportional to engine rotational speed. Preferably, in this embodiment, the ignition and RPM apparatus 16 includes a toothed wheel having at least six equispaced teeth around its periphery and a fixed electromagnetic, optic or other sensor adapted to generate an electric voltage pulse at the passing of each tooth. Thus a pulse is generated every sixty degrees of crankshaft rotation at ten degrees BTDC for a total of three teeth per firing for a four cylinder engine. There may be a seventh tooth adjacent one of the other six to identify a particular combustion chamber. For the system of this invention, the absolute relationship between the pulses and actual top dead center of crankshaft position need not be exact, since ignition timing is closed loop, but the angles between teeth should be substantially equal for accurate engine speed measurement.

Engine 10 includes combustion pressure sensors 20, which may be of the type shown in U.S. Pat. No. 4,491,010 to Brandt et al, issued Jan. 1, 1985 or its equivalent. The Brandt et al pressure sensor comprises a headbolt with a head adapted to be stressed by distortions in the head of engine 10 produced by the combustion pressure in the cylinders and having a piezoelectric element adapted to generate an electrical signal indicative of the changing combustion pressure. For a four cylinder engine, two such sensors 20, one placed between two of the cylinders and the other placed between the other two cylinders, may be sufficient to sense the combustion pressure of all four cylinders, although more may also be used if necessary to obtain pressure signals from all combustion chambers.

Figure 5:
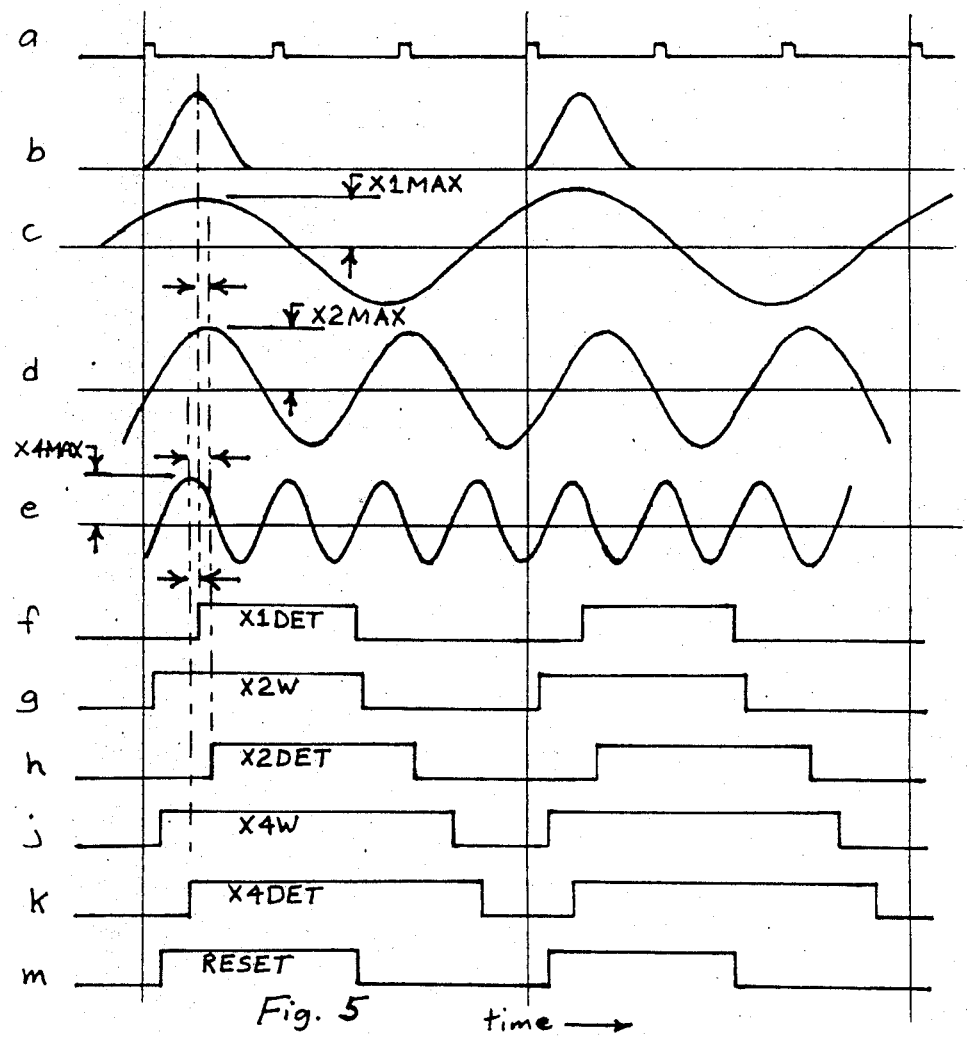
FIG. 5 shows time waveforms useful in understanding the operation of the control of FIG. 1.

The output signals from sensors 20, which are generally shown in FIG. 5b, are provided through normal charge amplifiers 21 to a summing junction 22. The summed signal is amplified in an AGC amplifier 23, the gain of which is controlled in a manner to be described. Automatic gain control is preferred because of the wide dynamic range of the signals from sensors 20. Since the information to be used from the signals is in the form of phase differences and amplitude ratios of harmonics of the pressure signal, the use of AGC does not affect the information in the signals adversely. The gain controlled signal from the output of amplifier 23 is provided through scaling amplifiers 25, 26 and 27 to bandpass filters 30, 31 and 32, respectively. Care must be taken with the amplifiers and summing junction circuitry to prevent non-linearity or narrow bandwidth from introducing phase shift into the signal, since phase differences in the harmonics are used to control ignition timing. In particular, there should be no diodes in the summing junction; and the amplifiers should have a flat bandwidth from the lowest harmonic (which might be the firing frequency or might be as low as ¼ the firing frequency for some applications using subharmonics) at the lowest expected engine speed to the highest harmonic at the highest expected engine speed. A typical bandwidth might be from approximately 0.5 Hz to several kHz.

Bandpass filter 30 is tuned, in a manner to be described, to the firing frequency of engine 10; bandpass filters 31 and 32 are tuned to higher harmonics of the firing frequency. In this embodiment, filter 31 is tuned to the second harmonic, X2 or double the firing frequency; and bandpass filter 32 is tuned to the fourth harmonic, X4 or four times the firing frequency. Scaling amplifiers 25, 26 and 27 are used to adjust the relative amplitudes of the harmonic signals to the same order of magnitude for signal processing and are of constant predetermined gain. Filters 30, 31 and 32 are of the switched capacitor type (mf10), with accompanying components as specified by the mf10 specification sheets to produce a relatively sharply tuned (Q=20) bandpass filter with variable center frequency. The outputs of filters 30, 31 and 32 are shown as the sine waves of FIGS. 5c, 5d and 5e, respectively.

A PLL clock generator 35 controls the tuned frequencies of filters 30, 31 and 32 continuously and simultaneously in response to signals from a computer 36, which receives engine speed signals from the RPM indicating pulses generated in ignition apparatus 16 or, alternatively, some other RPM indicator such as a toothed flywheel. It has been found that a six toothed wheel as described above provides sufficient resolution for the RPM signal. Computer 36 monitors the rotational speed of engine 10 and controls the bandpass filters 30, 31 and 32 to follow the firing frequency of engine 10 (which is proportional to the RPM) and its X2 and X4 harmonics. Computer 36 may be of the computer on a chip type exemplified by the 68HC11 microcomputer found in the VMS-46 (T) dual 68HC11 single chip module controller system available from Advanced Electronics Diagnostics, Inc. and will be described with more detail in connection with the flow chart of FIG. 6 and at other points throughout this description.

The outputs of bandpass filters 30, 31 and 32 are provided to peak detect apparatus 37 and the sample inputs of sample and hold apparatus 38. Peak detect apparatus 37 determines and generates a pulse at the peak of each of the X1, X2 and X4 signals and provides the pulses for the X2 and X4 harmonics (X2DET and X4DET) to input capture inputs of computer 36. In addition, it provides the pulses for all three signals to the trigger inputs of sample and hold apparatus 38, whereby the peak amplitudes of the three signals (X1MAX, X2MAX and X4MAX) are sampled and provided to A/D inputs of computer 36. Finally, the maximum sampled peak amplitude is also provided to an AGC control 40, which generates the AGC control signal for AGC amplifier 23. Computer 36 is programmed to compare the timing and amplitudes of the peaks as provided by apparatus 37 and 38, to calculate therefrom output control signals for EGR valve 13 and ignition timing apparatus 16 and to provide those output control signals to the appropriate apparatus.

PLL clock generator 35 is described in more detail with reference to FIG. 2. A crystal controlled oscillator 45 generates a high frequency such as 256 KHz to be divided in divider 46 down to 100 Hz, which represents the smallest frequency step for the output of PLL clock generator 35 and corresponds to a smallest frequency step in filters 30, 31 and 32 of less than 1 Hz. If a different frequency step is desired, it can be obtained by reprogramming divider 46. The 100 Hz signal from divider 46 is provided to the input of PLL chip 47 (4046). PLL chip 47, which acts as a frequency multiplier, contains an internal oscillator which outputs a higher frequency signal, which is fed back through a counter 48 to another input of PLL chip 47. Each pulse from the output of PLL chip 47 is counted by counter 48 until the loaded contents of counter 48 are reduced to zero and an output pulse is sent to PLL chip 47. The time of occurrence of this pulse is compared with the next pulse of the 100 Hz signal to adjust the internal oscillator of the PLL chip and maintain the proper output frequency as determined by the loaded count of counter 48 in phase lock loop operation. The count of counter 48 is obtained from computer 36 through parallel output lines as shown. Computer 36 determines the count from the monitored rotational speed of engine 10 by timing between consecutive speed signal input pulses and dividing the time interval into a constant. Thus, the output frequency of PLL chip 47 is maintained proportional to the firing frequency of engine 10, with a typical value of 100 KHz at 1000 RPM. This output is provided to a divider 50, which provides outputs proportional to the firing frequency, the X2 frequency and the X4 frequency for application to the switched capacitor bandpass filters 30, 31 and 32, which filters' center frequency and pass band thus follows the firing frequency of engine 10.

There are actually two outputs from each of bandpass filters 30, 31 and 32: the normal output and another output from the "cosine" output pin of the switched capacitor filter chips. Since the normal output is a sine wave and the cosine output is a cosine wave of the same frequency, the latter is the time derivative of the former; and the peak of the former can be identified by the "zero" crossing of the latter. However, peak detection is not quite so simple, since there are both positive and negative peaks, there are several peaks of a higher harmonic for each peak of a lower harmonic, and the peaks of different harmonics are not necessarily in phase with each other. It is desirable to obtain the peaks of the higher harmonic signals that most closely correspond with the peaks of the fundamental signal and with each other. Thus, the peak detect circuit must be adapted to the particular harmonics of the system. In this system, the X1 (fundamental), X2 and X4 harmonics are all peak detected.

The peak detect circuit is shown in FIG. 4. The normal signal X1 from filter 30 is provided through a capacitor 52 to the non-inverting input of a zero detect comparator 53 having a tie-up resistor 55 to the voltage source V and an inverting input connected to the reference "zero" level V/2 and through a resistor 56 to the non-inverting input. The output is a square wave X1Z which goes high when the sine wave input goes up through zero and goes low when the sine wave input goes down through zero. Similar circuits are provided for the cosine signal C1 from filter 30 (producing output C1Z) and the similar signals from filters 31 (X2, C2) and 32 (X4, C4), although they are not shown in FIG. 4. The applications of their outputs are shown as inputs to elements of the circuit.

The output of comparator 53, signal X1Z, is provided to the D input of a flip-flop 57 having a C (clock) input receiving signal C1Z. The flip-flop is "armed" with a high D input when the fundamental frequency signal goes positive, so that its Q output goes high along with the C input when the cosine signal from filter 30 goes high, which is at the peak of the sine signal from filter 30. Thus the Q output of flip-flop 57, which comprises the X1DET signal provided to sample and hold circuit 38, goes high with the positive peak of the X1 signal, as seen in FIG. 5f.

Signal X1Z is also provided to the D input of flip-flop 58 having a C input provided with signal X2Z. The Q output of flip-flop 58 is provided to the D input of a flip-flop 60 having a C input receiving signal C2Z. Flip-flop 58 generates an X2 window (X2W) to arm flip-flop 60 during the first positive half cycle of X2 after the start of the positive half cycle of X1, as seen in FIG. 5g. Thus, flip-flop 60 will generate the output X2DET at the maximum of X2 closest to the maximum of X1, as shown in FIG. 5h.

Signal X4Z is provided to the C input of a flip-flop 61 having a D input connected to the Q output of flip-flop 58. The Q output of flip-flop 61 is connected to the D input of a flip-flop 62. The Q output of flip-flop 61 generates an X4 window (X4W) with the first positive half cycle of X4 following the beginning of the X2 window, as shown in FIG. 5j. Flip-flop 62 has a C input receiving signal C4Z and an output providing the signal X4DET as X4 reaches its first positive peak within the X4 window, as seen in FIG. 5k. It should be noted that the logic described in this paragraph for X4DET will not catch the correct peak if X4 becomes so advanced with respect to X2 that the desired positive half cycle of X4 begins before the desired positive half cycle of X2. However, this is not expected to be a problem, since X4 does not become this far advanced with respect to X2 in normal operation of the engine. If it did occur, the derived phase difference between X2 and X4 would become so large that it would be easy to detect in software comparison with predetermined limits and ignore. However, if desired, the circuit of FIG. 4 could be modified by the addition of another flip-flop having a D input receiving X2Z, a C input receiving X4Z and a Q output ORed with the Q output of flip-flop 61 at the D input to flip-flop 62. This would create the X4 window when the later of X2 and X4 began its positive half cycle within the positive half cycle of X1, no matter which of X2 and X4 started first.

An additional flip-flop 63 receives signal X1Z on its D input and signal X4Z on its C input. The output of flip-flop 63 is a RESET signal, shown in FIG. 5m, connected to the R (reset) input of flip-flop 57 to reset it for the next X1 peak detect with the first upward X4 zero crossing in the negative half cycle of X1. This function is not necessary for the X2 and X4 peak detect flip-flops since there are multiple upward zero crossings of the higher harmonics for each such crossing of X1 and they thus reset themselves by means of the C and D inputs before the next peak detect.

Thus the closest corresponding peaks of X1, X2 and X4 are detected and computer 36 notified of at least the X2 and X4 peaks, whereupon computer 36 notes the time of each from an internal real time clock. In addition, the X2 window signal from the Q output of flip-flop 58 is separately provided to computer 36 and sample and hold circuit 38 for uses to be described.

A portion of sample and hold circuit 38 is shown in FIG. 3. FET 70 is used as a switch to connect signal voltage X1 to a capacitor 71, connected to ground, when FET 70 is turned on by a one shot 72. One shot 72 is triggered by the peak signal X1DET. During the on period of one shot 72 and FET 70, capacitor 71 charges or discharges through FET 70 to the level of X1. A buffer amplifier 73 provides the sampled peak value of X1: X1MAX with minimal charge leakage from capacitor 71. It further connects capacitor 71 through a diode 75 to a junction 76 having similar connections through diodes 77 and 78 from similar circuits generating X2MAX and X4MAX. These circuits are not shown, since they are identical to the circuit for X1MAX. The diode connections to junction 76 provide a "highest wins" configuration. Junction 76 is connected through another FET 80 to a capacitor 81 connected to ground. FET 80 is turned on by one shot 82, which is triggered by the downward or trailing edge of the X2W window voltage from peak detect circuit 37 previously described. During the period that FET 80 is turned on, the voltage on junction 76, which is the highest of X1MAX, X2MAX and X3MAX, is transferred to capacitor 81. The voltage on capacitor 81 is provided to AGC control circuit 40 through a buffer amplifier 83. AGC control circuit 40 may include standard proportional plus integral control circuitry for processing the voltage for application to the gain control input of amplifier 23 in FIG. 1.

Computer 36 is controlled by a stored internal program which will be described with reference to the flow chart of FIG. 6. It is assumed that computer 36 includes input capture which automatically responds to pulses on a plurality of input lines assigned to receive pulses from the RPM sensor included in the ignition and RPM apparatus 16 and the peak detect pulses X2DET and X4DET: to read the time of such pulses on an internal real time clock, store a number of each said time in an assigned input register and set an appropriate flag to indicate the event. Such a flag, once set, prevents further capture of that input until the flag is cleared by the program. In addition, the window signal X2W is provided to a digital input port of computer 36. It should be kept in mind that there will be only one RPM pulse every sixty degrees of engine crankshaft rotation (unless there is a seventh tooth) and only one X2DET and X4DET pulse per combustion chamber firing. Therefore, there will be sufficient time for the control program charted in FIG. 6 to read the process the captured inputs in its normal operation, without the use of a special interrupt routine, and still have time to clear the flag before the next input is expected.

Figure 6:
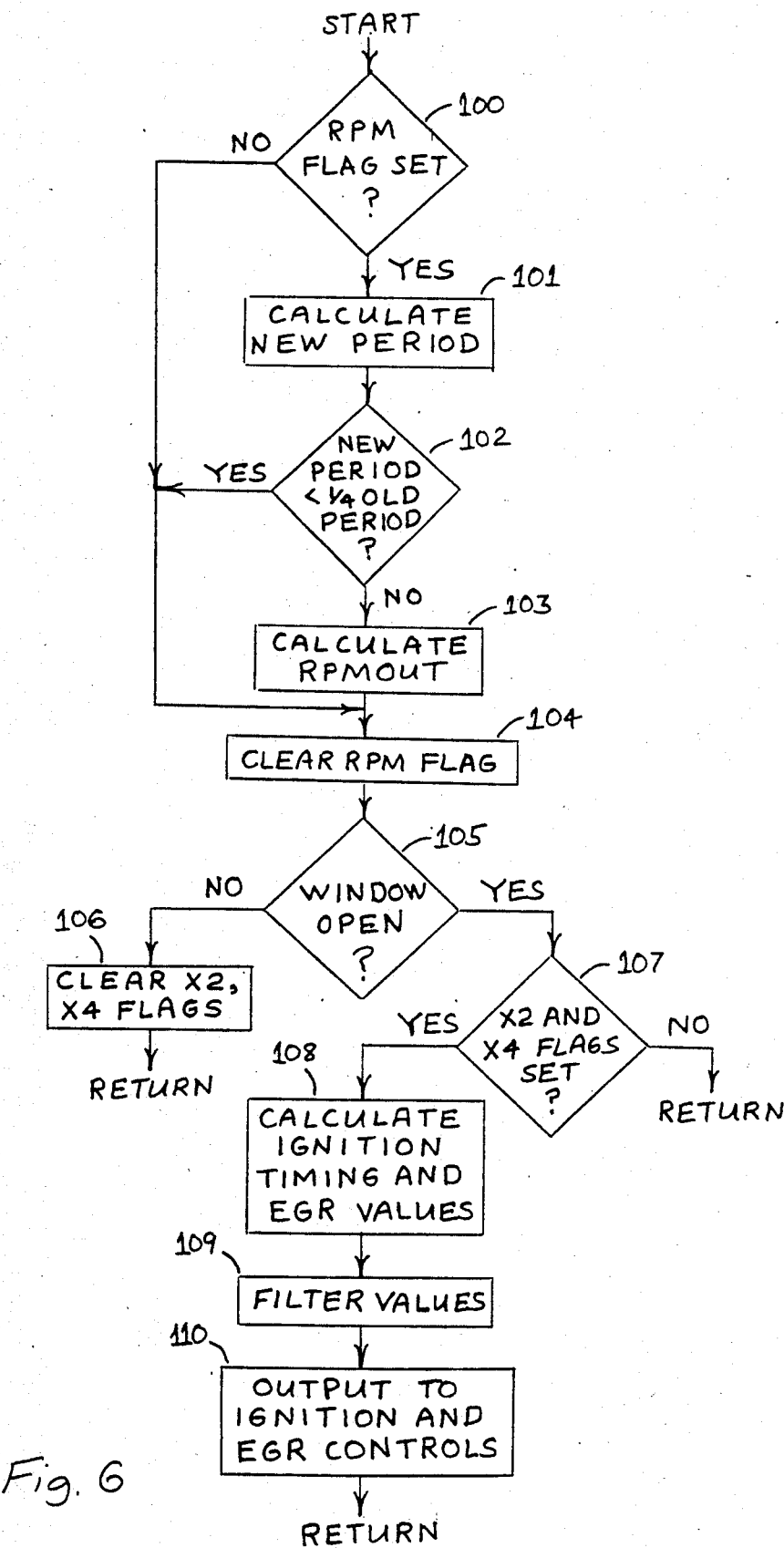
FIG. 6 is a flow chart describing the operation of the computer used in the control of FIG. 1.

The basic outline of the control program is shown with reference to FIG. 6, with obvious and particular computer dependent housekeeping tasks omitted. It begins by determining, at decision point 100 if the RPM flag is set. If so, an RPM pulse has been received; and it is time to determine the time elapsed since the last RPM pulse in order to calculate a speed number RPMOUT for output to PLL clock generator 35. A new period is calculated at step 101 by subtracting OLDTIME, the time of the last previously received RPM pulse, from NEWTIME, the time of the pulse just received. The old, or last calculated period has also been saved; and if the new period is less than ¼ of the old period at decision point 102, the new period is considered invalid, since it represents an impossible acceleration of the engine. The routine thus skips the next step 103. Otherwise, the RPMOUT value is calculated in step 103 before the RPM flag is cleared in step 104. The RPM is also cleared in step 104 if step 103 is skipped, since the new reading is not wanted. The determination of decision point 102 is primarily included for the case of a 7 toothed wheel in the RPM generator. Since the seventh tooth is closely adjacent one of the other six teeth, the period between them will be very short compared with the normal period between any of the other 6 teeth; and the pulse from the seventh tooth will thus be identified and ignored by the routine. The calculation of RPMOUT is accomplished by dividing the new period into a constant to invert units from [time/angle] to [angle/time] and properly scale the number for output to PLL clock generator 35.

After step 104, computer 36 checks the X2W window input to determine, at decision point 105, if the window is open: that is, if the window signal is high as shown in FIG. 5g. If not, the computer clears the X2 and X4 flags before returning to the start. If so, the computer checks the X2 and X4 flags at decision point 107 to determine if they are both set. If they are not both set, there is insufficient information for calculations; and the computer returns to the start. However, if they are both set, it is time to calculate the engine control values and output them to the respective controls. It may be possible, due to the effect of noise or some other minor error, for the engine to go entirely through the window open period without receiving one of the X2DET or X4DET signals. In this case, no calculations will be performed during the firing of that combustion chamber, since the X2 and X4 flags are not both set. It is in order to clear the X2 and X4 flags in that circumstance that step 106 is included, so that both input lines will be cleared at the end of the window open period for new signals during the next firing. Otherwise the clearing of the X2 and X4 flags would be more naturally placed after the calculations. There is no need for it after the calculations in this embodiment, however, since the clearing will take place after the end of the X2W window.

The ignition timing and EGR values are calculated in step 108, which actually represents one or more subroutines to be called. The ignition timing value is determined from the phase difference between two of the harmonic peaks: in this embodiment, the difference in time between X2DET and X4DET. The difference in the stored times of these events is calculated. The sign of this difference determines if ignition timing is to be advanced or retarded: it is to be advanced if X4DET occurs first and vice versa. The absolute value of the difference is converted to crankshaft angle with a multiplication by a number representing RPM; and the result determines the amount of correction, as modified by filter functions to be described.

The EGR value is determined from the ratio of the maximum value of one of the higher harmonics to that of another harmonic, particularly to the fundamental: in this embodiment X4MAX divided by X1MAX. The ratio is compared to a desired reference value to determine both the direction and amount of correction. EGR is to be increased if the value of X4MAX is too large compared to that of X1MAX and vice versa, with the difference in ratios determining the amount, as modified by the filter functions to be described.

The values for ignition timing and EGR correction may be subjected to whatever filtering may seem appropriate; however, in this embodiment, there are two such functions. The first is a first order digital low pass filter function of the form $VAVG_{new} = VAVG_{old} + 1/n_1(V_{new} - VAVG_{old})$. In this well known function, a filtered value VAVG is periodically updated by adding to the last value thereof a fraction of the difference between the latest input $V_{new}$ and the old filtered value $VAVG_{old}$, the fraction being determined by the constant $n_1$. The updating, in this embodiment, may occur at the general rate of once during each combustion chamber firing; and step 109, just after the calculations of step 108, is a convenient time for it.

The other filter function of step 109 is an integral plus proportional function of the form CORRECTION = INTEGRAL FACTOR + PROPORTIONAL FACTOR + OFFSET. The programming of this function will be well known to those skilled in controls; and its calibration will depend on the type of engine and variation of the control desired.

Once the output values have been computed, they may be output to the ignition and EGR controls in step 110. A portion of these controls may be included as additional programming in computer 36; but the mechanics of programming to generate an ignition pulse at the proper time in reference to a crankshaft reference pulse or to output a control signal to an EGR valve are well known and described in the prior art. One possibility of this system not known in the prior art, however, is that of dispensing entirely with the crankshaft reference pulses, except temporarily during starting, and running closed loop ignition timing with reference to the peak timing X1DET of the fundamental signal. In the otherwise normal ignition timing, wherein the ignition pulse is generated a determined crankshaft angle after a reference crankshaft pulse, the rise of the X1DET signal, which indicates the positive peak of the combustion pressure fundamental frequency waveform, is used in place of the crankshaft reference pulse. This means that there does not have to be an accurately known relationship between the pulses generated in the ignition and RPM apparatus 16 and absolute crankshaft position. Not having to maintain this accuracy in absolute crankshaft position has the potential for cost savings in engine and control design. During the short period of engine starting before the loop is closed, the engine may use the crankshaft reference pulses to get started, even though they are not especially accurately related to absolute crankshaft position. As soon as the loop is closed, the ignition timing will become more accurate through the feedback.

In a modification of the apparatus shown in FIG. 1, an engine roughness or driveability sensor is created. Additional switched capacitor bandpass filters similar to filters 30, 31 and 32 are added to produce selected subharmonics of the engine firing frequency. This is based on the fact that these subharmonics appear to be associated with different cylinders missing or firing weakly compared to the others. For example, a four or eight cylinder engine might include filters for ¼, ½ and-/or ¾ the firing frequency, since individual cylinders fire at a rate one fourth the total firing rate. A six cylinder engine might include filters at ⅓ and/or ⅔ the firing frequency, since individual cylinders fire at a rate one sixth the total firing rate. Each is provided with its own input scaling amplifier similar to amplifier 25 and its own output lines to peak detect apparatus 37 and sample and hold apparatus 38. It is not necessary to coordinate the peak detection of these signals to specific peaks of the other signals, since only their peak amplitudes will be used. Therefore any peak reading apparatus may be used, with output supplied to computer 36. The relative peak amplitudes of these signals are compared with that of the fundamental signal (X1MAX). If any of them are significantly greater, compared to X1MAX, than they should be, according to predetermined reference ratios, a misfire or roughness signal is generated. It may be possible to identify the specific missing or weakly firing cylinders from identification of the specific signals whose peaks are too large. The dilution control may be made responsive to the ratio of the harmonic to the fundamental which exceeds by the greatest percentage its desired level in closed loop to maintain driveability. In addition, if the misfiring cylinder can be identified, an adjustment to the air/fuel ratio of that cylinder could be made to bring it back in line with the correctly firing cylinders. The AGC control may be made responsive to these signals as well as the others described above. The specific apparatus and connections required for the preceding should be obvious to one skilled in the art in view of the rest of the preceding description.

The embodiments of the invention in which an exclusive property or privilege is claimed are defined as follows:

1. An ignition timing control for an internal combustion engine including a combustion chamber, means effective to ignite a combustible charge in the combustion chamber and power output apparatus including a rotating crankshaft driven in response to the expansion of the ignited combustible charge, the ignition timing control comprising, in combination:

pressure sensing means effective to sense the pressure in the combustion chamber and generate a combustion pressure signal therefrom;

means effective to sense the rotational speed of the crankshaft;

frequency selective filter means for generating at least two predetermined harmonic signals of the combustion pressure signal, the frequency selective filter means being responsive to the last means to maintain the frequencies of the harmonic signals at whole number multiples of the firing frequency of the engine as the rotational speed of the crankshaft changes;

means effective to detect the times of corresponding peaks in the two predetermined harmonic signals and determine the difference therebetween; and means for varying the ignition timing of the engine to reduce the difference to zero in closed loop operation.

2. The ignition timing control of claim 1 wherein the harmonic signals have frequencies twice and four times, respectively, the firing frequency of the engine and the ignition timing is advanced if the harmonic with four times the firing frequency precedes the other.

3. The ignition timing control of claim 1 in which the frequency selective filter means generates a harmonic signal at the firing frequency of the engine, the ignition timing control further comprising in combination:

means for detecting the timing of the peak of the harmonic signal at the firing frequency of the engine; and means cooperating with the means for varying the ignition timing to reference the ignition timing to the peaks detected by the last means.

4. The ignition timing control of claim 1 in which:

the means effective to sense the rotational speed of the crankshaft comprises frequency multiplying means for generating a pulsating signal at a frequency proportional to the rotational speed of the crankshaft;

the frequency selective filter means comprises a plurality of switched capacitor filters clocked by the pulsating signal to maintain narrow passbands at whole number multiples of the engine firing frequency and generating from the combustion pressure signal sine and cosine wave harmonics thereof; and the means effective to detect the times of corresponding peaks uses the zero crossing of the cosine wave harmonic to identify the peak of the corresponding sine wave harmonic.

* * * * *